United States Patent [19]

Satoh

[11] Patent Number: 4,841,814

[45] Date of Patent: Jun. 27, 1989

[54] SYSTEM FOR CONTROLLING THE PRESSURE OF OIL IN A SYSTEM FOR A CONTINUOUSLY VARIABLE TRANSMISSION

[75] Inventor: Keiji Satoh, Musashino, Japan

[73] Assignee: Fuji Jukogyo Kabushiki Kaisha, Tokyo, Japan

[21] Appl. No.: 189,973

[22] Filed: May 4, 1988

[30] Foreign Application Priority Data

May 12, 1987 [JP]  Japan ................................ 62-115464

[51] Int. Cl.[4] ....................... B60K 41/12; B60K 41/18
[52] U.S. Cl. .......................................... 74/866; 74/867
[58] Field of Search ......................... 74/867, 866, 864; 474/28, 18

[56] References Cited

U.S. PATENT DOCUMENTS

| | | | |
|---|---|---|---|
| 4,628,773 | 12/1986 | Itoh et al. | 474/28 X |
| 4,644,827 | 2/1987 | Tanako et al. | 74/866 |
| 4,663,991 | 5/1987 | Nakamura et al. | 74/866 X |
| 4,674,363 | 6/1987 | Miyawaki | 74/866 |
| 4,735,597 | 4/1988 | Cadeé | 74/861 X |
| 4,736,655 | 4/1988 | Kumura et al. | 74/866 |
| 4,751,859 | 6/1988 | Itoh et al. | 74/867 X |
| 4,752,277 | 6/1988 | Morimoto | 474/28 X |

Primary Examiner—Leslie A. Braun
Assistant Examiner—William Gehris
Attorney, Agent, or Firm—Martin A. Farber

[57] ABSTRACT

A system for a continuously variable transmission has a line pressure control valve having a spool, a first hydraulic circuit having a pump for supplying oil to the transmission through the line pressure control valve. A second hydraulic circuit is provided for supplying oil to the line pressure control valve so as to shift the spool. A flow rate control valve is provided in the second hydraulic circuit for regulating flow rate of oil passing therein to a constant value, and a reducing valve is provided in the second hydraulic circuit at a downstream position of the flow rate control valve so as to produce a constant pressure of oil. The constant pressure is regulated by a control valve so as to shift the spool of the line pressure control valve, thereby controlling line pressure.

19 Claims, 5 Drawing Sheets

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for stabilizing control pressure in a hydraulic circuit for the transmission.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulley in dependency on driving conditions. The system is provided with a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The output of an engine is transmitted to the drive pulley through a clutch. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (upshaft). At that time if the engine speed is kept constant, the transmission ratio is automatically and continuously reduced at a speed rate which is decided by the line the pressure, pressure of oil supplied to the servo device of the drive pulley, and the actual transmission ratio of the transmission.

Japanese Patent Laid Open No. 62-52261 (U.S. Pat. No. 4,674,363) discloses a hydraulic circuit provided with a reducing valve so as to generate a constant control oil pressure, for example, of 4 kg/cm$^2$. The oil pressure is supplied to the transmission ratio control valve and line pressure control valve as a basic oil pressure. Two solenoid operated valves are provided to regulate the constant pressure so as to apply appropriate control pressures to the transmission ratio control valve and line pressure control valve.

In the hydraulic circuit, in order to firmly hold the belt on the pulleys at each transmission ratio, line pressure varies from 5 to 30 kg/cm$^2$ dependent on engine torque. On the other hand, the pressure controlled by the reducing valve must always be constant, for example at 4 kg/cm$^2$, despite the change of the line pressure. However, the solenoid operated valves are adapted to be closed when the transmission ratio is large and the engine load is heavy, and to open when the transmission ratio is small and the engine load is light. Thus, the amount of oil supplied from the oil pump through the reducing valve is maximum at the smallest transmission ratio and minimum at the largest transmission ratio. Therefore, when the line pressure is high, the amount of oil drained from the reducing valve is large. Accordingly, the oil pump must have a large capacity. If there is not enough, the line pressure is reduced, thereby causing the belt to slip on the pulleys.

SUMMARY OF THE INVENTION

The object of the present invention is to prevent the excessive oil from draining out from the reducing valve so as to enable the use of a pump having a small capacity.

According to the present invention, there is provided a control system for a continuously variable transmission for transmitting the power of an internal combustion engine, the transmission comprising a drive pulley having a hydraulically shiftable disc and a first hydraulic cylinder for shifting the disc, a driven pulley having a hydraulically shiftable disc and a second hydraulic cylinder for operating the disc, and a belt engaged with both pulleys, the system comprising a line pressure control valve having ports and a spool, a transmission ratio control valve having ports and a spool, a first hydraulic circuit having a pump for supplying oil to the first cylinder through the line pressure control valve and transmission ratio control valve.

The system further comprises a second hydraulic circuit for supplying oil to the line pressure control valve so as to shift its spool, a flow rate control valve provided in the second hydraulic circuit for regulating flow rate of oil passing therein to a constant value, a reducing valve provided in the second hydraulic circuit at a downstream position of the flow rate control valve so as to produce a constant pressure of oil, and control valve means provided in the second hydraulic circuit at a downstream position of the reducing valve for controlling the amount of oil supplied to the spool of the line pressure control valve to control line pressure.

The other objects and features of this invention will become understood from the following description with reference to the accompanying drawings.

DETAILED DESCRIPTION OF THE PREFERRED EMBODIMENTS

Figure 1:
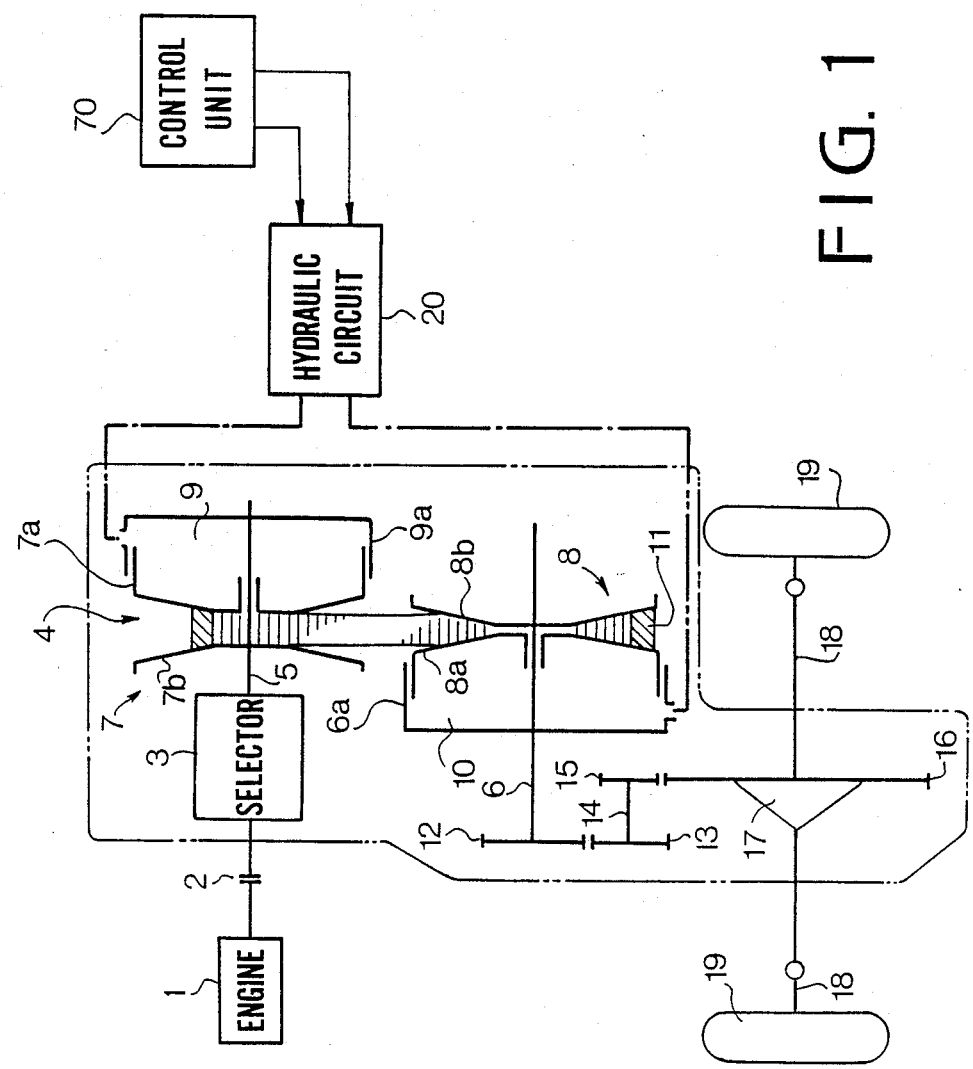
FIG. 1 is a schematic illustration of a continuously variable belt-drive transmission.

Referring to FIG. 1, the continuously variable belt-drive automatic transmission for a motor vehicle to which the present invention is applied, comprises an electromagnetic powder clutch 2 for transmitting the power of an engine 1 to transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with hydraulic circuit 20. A drive belt 11 engaged with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of driving wheels 19 of the vehicle through a differential 17.

Figure 2A:
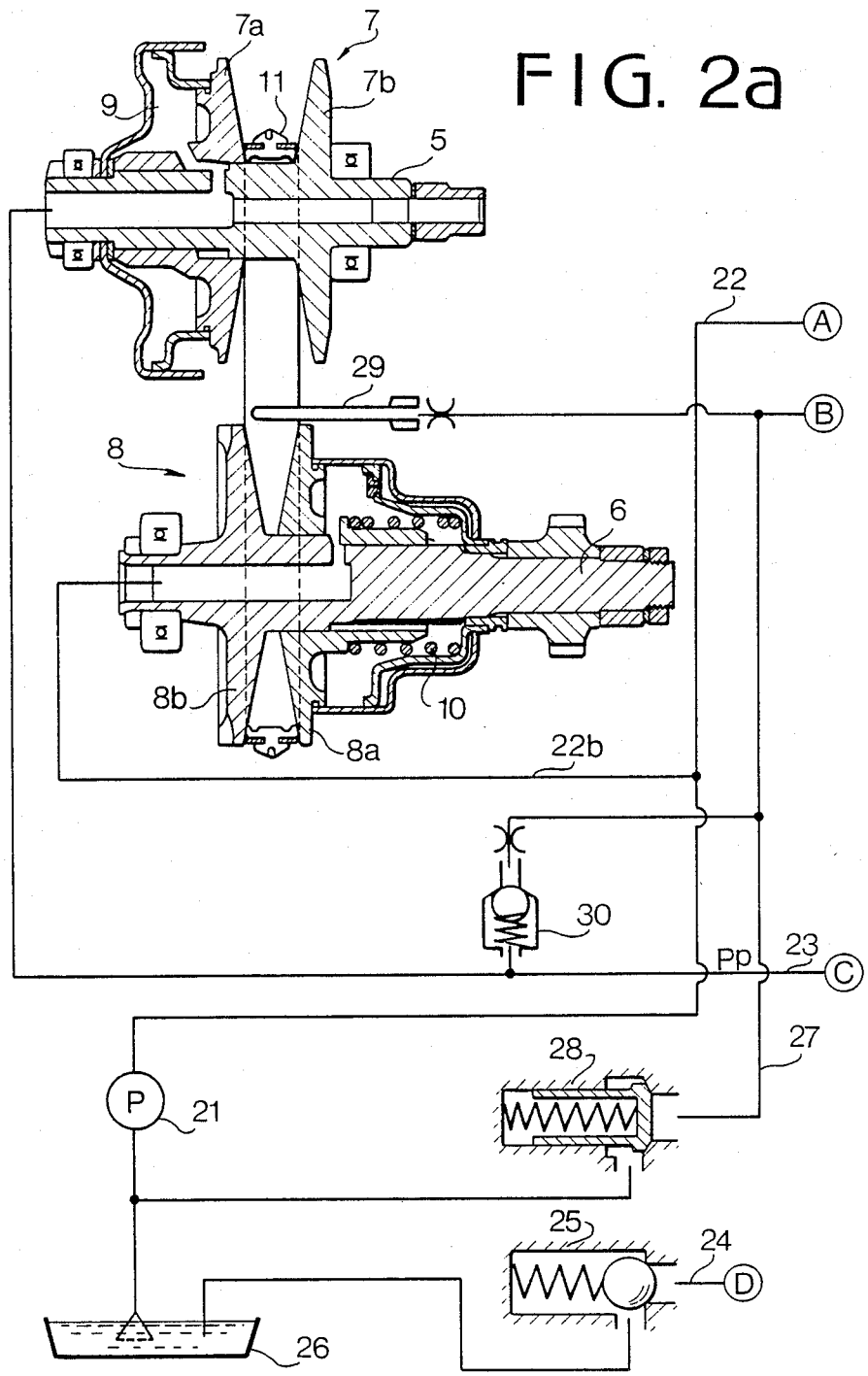
FIGS. 2a to 2c are schematic diagrams showing a control system according to the present invention.
Figure 2B:
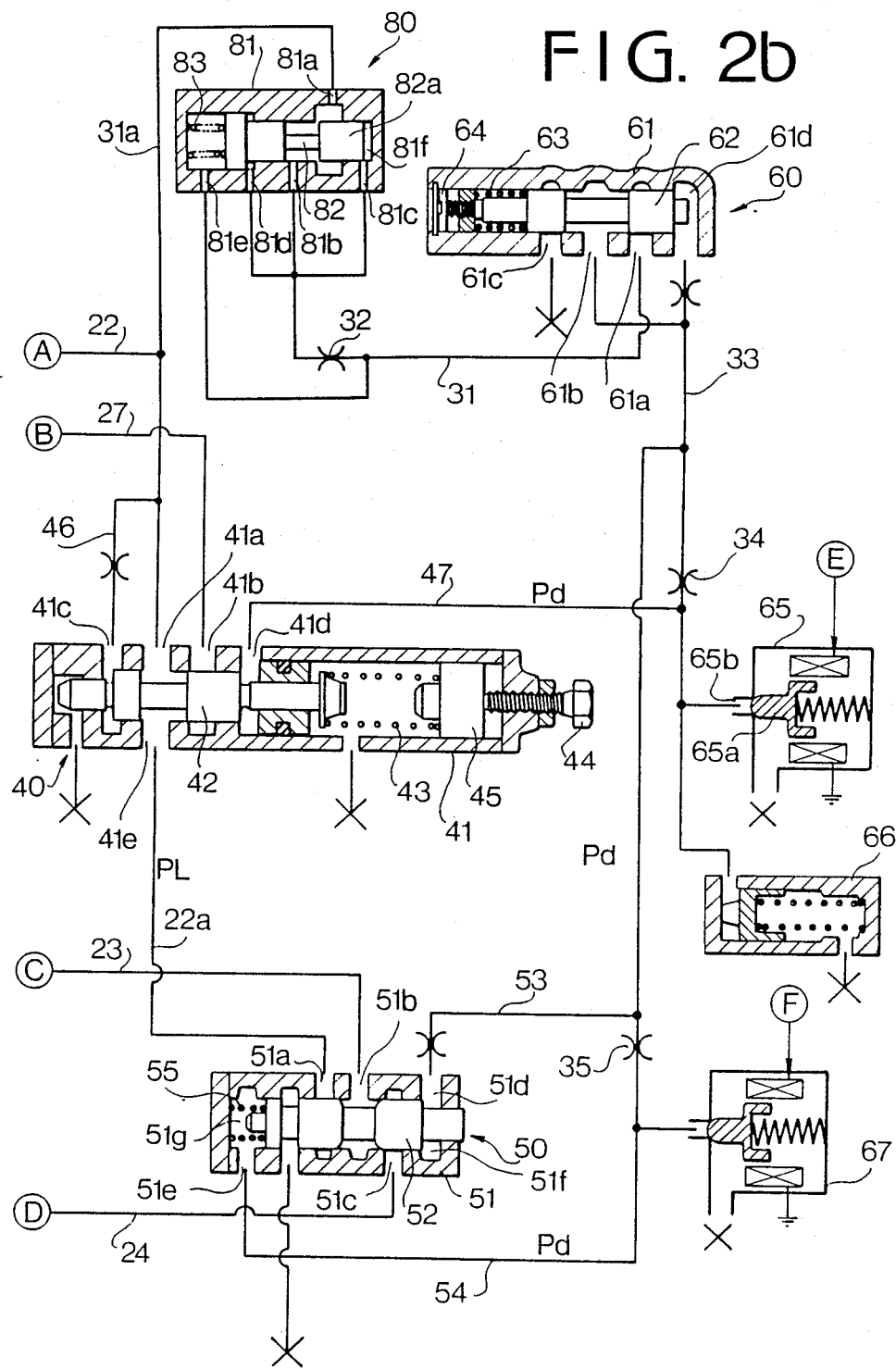
Figure 2C:
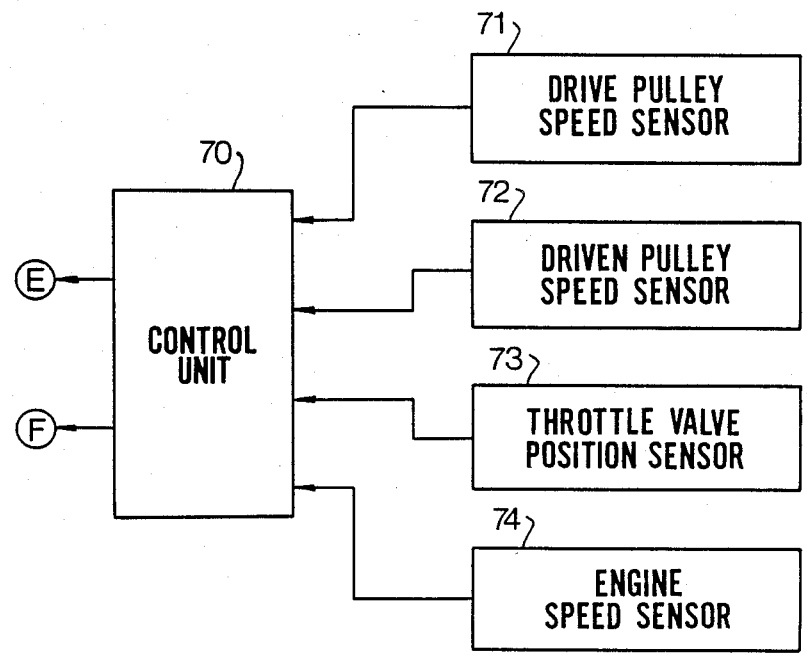

Referring to FIGS. 2a to 2c, the hydraulic circuit 20 includes a line pressure control valve 40 and a transmission ratio control valve 50. The line pressure control valve 40 comprises a valve body 41, spool 42, and ports 41a, 41b, 41c, 41d, 41e. The chamber 9 of the drive pulley 7 is applied with pressurized oil by an oil pump 21 from an oil reservoir 26 passing through a line pressure conduit 22, ports 41a and 41e of line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8.

In accordance with the present invention, the line pressure control valve 40 has an axially slidable spring retainer 45, a spring 43 provided between the spool 42 and the retainer 45, and an adjust screw 44 screwed in the spring retainer 45 for adjusting the position of the retainer 45. The spool 42 is applied with pressurized oil supplied to a chamber communicating with port 41c through a conduit 46. The spool 42 is urged to the left by the force of spring 43. The port 41a is communicated with port 41b of a drain passage 27 depending on the position of a land of the spool 42.

The transmission ratio control valve 50 comprises a valve body 51, spool 52, and spring 55 for urging the spool in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with line pressure control valve 40 through conduit 22a. The drain port 51c is communicated with the oil reservoir 26 through a conduit 24 and check valve 25. The drain port 41b of the line pressure control valve 40 communicates with oil reservoir 26 through passage 27 and a lubricating oil pressure providing valve 28 in the form of a check valve. The passage 27 is further communicated with conduit 23 through a check valve 30. A part of the oil in the passage 27 is supplied to the pulley 8 from a nozzle 29 to lubricate the pulley device.

The system of the present invention is provided with a pressure reducing valve or pressure control valve 60, pressure compensated flow control valve 80, and solenoid operated on-off control valves 65 and 67.

The pressure compensated flow control valve 80 comprises a valve body 81, ports 81a to 81e and end chamber 81f formed in the valve body 81, and spring 83 urging a spool 82 toward the end chamber 81f having port 81c. The inlet port 81a is connected to the oil reservoir 26 through conduits 31a and 22. The outlet port 81b is connected to the reducing valve 60 through a conduit 31 having an orifice 32. The control ports 81c and 81d are connected to the conduit 31 at an upstream position of the orifice 32 and the port 81e is connected to the conduit 31 at a downstream position of the orifice 32. The spool 82 is positioned in dependency on the difference between the pressures in the conduits 31a and 31 to regulate the flow rate of oil.

The pressure reducing valve 60 comprises a valve body 61, spool 62, ports 61a, 61b and 61c, end chamber 61d, and spring 63 urging the spool 62 toward the chamber 61d. The load of the spring 63 can be adjusted by a screw 64. The port 61a is connected to the port 81b of the flow control valve 80 through the conduit 31, and port 61b and chamber 61d are connected to a conduit 33. When the pressure in the conduit 33 reduces, the spool 62 is shifted to the right by spring 63, so that port 61a communicates with port 61b to increase the pressure in the conduit 33. Thus, a constant pressure of oil is provided in the conduit 33.

The conduit 33 is communicated with the port 41d of line pressure control valve 40 through an orifice 34 and a passage 47. The conduit 33 is also communicated with reservoir 26 through solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 at the downstream position of orifice 35 so as to drain the oil to the reservoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, control pressures applied to ports 41d, 51e are changed by changing duty cycles of pulses supplied to the control valves 65 and 67.

In the line pressure control valve 40, the relationship among spring load $F_S$ and line pressure PL, line pressure receiving area SL of the spool, control pressure $P_d$ at the port 41d, and control pressure receiving area $S_d$ is as follows:

$$F_S + P_d \cdot S_d = PL \cdot SL$$

$$PL = (P_d \cdot S_d + F_s)/SL$$

Accordingly, the line pressure PL is proportional to the control pressure $P_d$.

The relationship between the duty cycle (D) of pulses applied to the solenoid operated control valve 67 and the transmission ratio (i) is explained hereinafter.

The transmission ratio changing speed (rate) (di/dt) is a function of flow rate Q of oil supplied to the chamber 9, and the flow rate Q is a function of the duty cycle D, line pressure PL and primary pressure $P_p$ in the chamber 9, namely:

$$di/dt = f(Q) = f(D, PL, P_p)$$

The line pressure PL is decided by the transmission ratio i and engine torque T, and the primary pressure $P_p$ in the chamber 9 is decided by the transmission ratio i and the line pressure PL. Accordingly, assuming the engine torque T to be constant, $$di/dt = f(D, i)$$

$$D = f(di/dt, i)$$

Accordingly, the duty cycle D is decided by the transmission ratio changing speed (rate) di/dt and the transmission ratio i. On the other hand, the transmission ratio changing speed (rate) di/dt is dependent on the difference between the actual transmission ratio i and a desired transmission ratio id, $$di/dt = K (id - i)$$

where K is a coefficient.

Accordingly, if the transmission ratio changing speed (rate) di/dt is decided, the duty cycle D can be obtained from the transmission ratio i. When the actual transmission ratio i is larger than the desired transmission ratio id (i>id), the value of di/dt is negative. In such a state, the duty cycle D is increased to reduce the pressure in the chamber 51g so as to upshift the transmission. The downshift is performed in the reverse manner.

The system is arranged to control the transmission ratio i in accordance with the above described principle. In the system, a drive pulley speed sensor 71, driven pulley speed sensor 72, throttle valve position sensor 73, and engine speed sensor 74 are provided. Signals of these sensors are fed to the control unit 70. The control unit 70 produces output pulses with duty cycles which are decided by the input signals. The pulses are supplied to solenoids of valves 65 and 67 so as to control the line pressure and transmission ratio.

In operation, while the vehicle is at a stop, the duty cycles of pulses supplied to valves 65 and 67 are small. Since the duty cycle is small, the pressure at the port 51e of the valve 50 is high. Accordingly, the spool 52 of the valve 50 is at the right end position and the drain port 51c communicates with the chamber 9 through the conduit 23, so that chamber 10 of the driven pulley 8 is supplied with the line pressure through conduit 22b, and the chamber 9 of the drive pulley 7 is drained. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to the axles 18 of the driving wheels 19. Thus, the vehicle is started.

At that time the line pressure PL is at the highest value by the pressure control valve 40, since the duty cycle for the valve 65 is small, and the spool 42 of the control valve 40 is at the left end position. When the throttle valve is opened for acceleration, the duty cycle increases, so that the pressure in the chamber 51f of the control valve 50 becomes higher than the chamber 51g. Thus, the spool 52 is shifted to the left to communicate the port 51a with port 51b, so that oil is supplied to the chamber 9 through the conduit 23. On the other hand, duty cycle for the control valve 65 is increased, so that the control pressure at the port 41d of the valve 40 becomes low. The spool 42 of the valve 40 is applied with the line pressure at the port 41c and the control pressure at the port 41d and the force of spring 43. Since the control pressure reduces, the spool 42 of the valve 40 is shifted to the right. Accordingly, the port 41a communicates with the port 41b of the drain passage 27.

Thus, line pressure PL reduces, and the transmission is upshifted, since oil is still supplied to the chamber 9 through the control valve 50. When the opening degree of the throttle valve is reduced for deceleration, the duty cycle is reduced, thereby shifting the spool 52 to the right to drain the chamber 9. Thus, the transmission is downshifted.

When the pressure at ports 81d and 81c of the flow control valve 80 increases, the spool 82 is shifted to the left, thereby reducing the gas between the left end of a land 82a and the valve body 81. Thus, the flow rate of the oil passing through ports 81a and 81b reduces. To the contrary, when this pressure reduces, the flow rate increases. Thus, the flow rate passing to the reducing valve 60 is kept constant. Thus, the total amount of drain oil from the reducing valve 60 and solenoid operated valves 65 and 67 is always constant.

If the solenoid operated valves 65 and 67 are adapted to open when the engine speed is larger than 1200 rpm, the reducing valve 60 is set to keep the reducing pressure $P_R$ at 4 kg/cm$^2$ when both solenoid operated valves 65 and 67 are open. Accordingly, the necessary flow rate can be reduced. In addition, since excessive oil is not drained from the reducing valve 60, the regulated basic pressure is stable.

Figure 3:
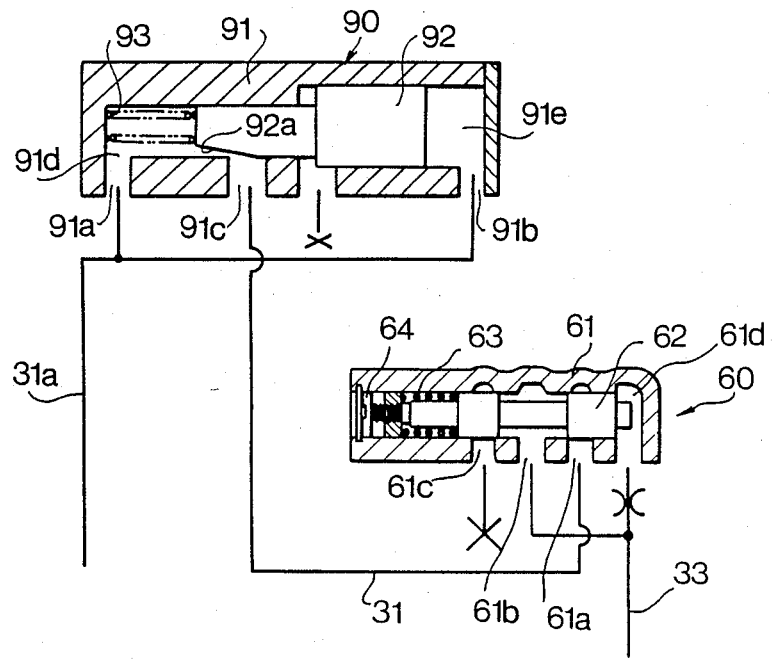
FIG. 3 is a schematic diagram showing another example of a flow control system.

Referring to FIG. 3 showing the second example, a flow control valve 90 is provided instead of the pressure compensated flow control valve 80 in the first embodiment.

The flow control valve 90 has a valve body 91, spool 92 having an orifice forming slant 92a, a spring 93 provided in an end chamber 91d, urging the spool 92 to the right. The slant 92a is adapted to change the flow rate from a port 91a to 91c. The port 91a of the chamber 91d and a control port 91b of a chamber 91e at the other end of the spool 92 are connected to the conduit 31a. The port 91c is connected to the port 61a of the reducing valve 60. The spool 92 is balanced by the line pressure applied to the chambers 91d and the force of the spring 93 and the line pressure applied to the chamber 91e.

When the line pressure in the conduit 31a rises, spool 92 is shifted to the left in FIG. 3 to reduce the orifice at the slant 92a so that flow rate from port 91a to 91c is reduced. When the line pressure in the conduit 31a is reduced, the spool 92 is shifted to the right, so that the flow rate increases. Accordingly, the flow rate passing to the reducing valve is constant.

From the foregoing, it will be understood that the present invention provides a hydraulic circuit where the pump loss is reduced and the use of a pump having a small capacity becomes possible. The flow rate passing to the reducing valve is constant so that line pressure control is ensured, thereby preventing the slipping of the belt on pulleys.

While the presently preferred embodiments of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an internal combustion engine, the transmission comprising a drive pulley having a hydraulically shiftable first disc and a first hydraulic cylinder for shifting the disc, a driven pulley having a hydraulically shiftable second disc and a second hydraulic cylinder for operating the second disc, and a belt engaged with both pulleys, the system comprising a line pressure control valve having a shiftable first spool, a transmission ratio control valve having a shiftable second spool, a first hydraulic circuit having a pump for supplying oil to the first cylinder through the line pressure control valve and transmission ratio control valve, the improvement in the control system which comprises:

a second hydraulic circuit for supplying the oil from the pump to the line pressure control valve so as to shift the first spool of the line pressure control valve;

a flow rate control valve provided in the second hydraulic circuit for regulating flow rate of oil passing therethrough from an inlet port thereof to an oulet port thereof to a constant value;

a reducing valve provided in the second hydraulic circuit and having an inlet communicated with the outlet port of the flow rate control valve so as to produce a constant pressure of oil at an outlet from said reducing valve;

control valve means provided in the second hydraulic circuit at a downstream position of the reducing valve communicating with said outlet of said reducing valve for controlling the amount of oil supplied to the first spool of the line pressure control valve so as to shift the first spool of the line pressure control valve to control line pressure in the first hydraulic circuit; and the flow rate control valve comprising a shiftable pressure responsive spool, the inlet port communicating with the pump, the outlet port variably communicating with the inlet port depending on position of the pressure responsive spool, at least one control port communicating with another of said ports of the flow rate control valve, and a spring mounted so as to urge the pressure sensitive spool in a direction against pressure applied on the pressure responsive spool from said at least one control port, the pressure responsive spool and said ports of said flow rate control valve being cooperatively arranged so as to keep the flow rate of the oil passing from the inlet port to the outlet port constant.

2. The control system according to claim 1 wherein the control valve means is a solenoid operated on-off valve.

3. The system according to claim 1, wherein
none of said ports of said flow rate control valve communicate with outlet ports of said line pressure control valve.

4. The system according to claim 3, wherein
the inlet port of said flow rate control valve and an inlet port of said line pressure control valve communicate with a common line from said pump.

5. The system according to claim 1, wherein
the inlet port of said flow rate control valve and an inlet port of said line pressure control valve communicate with a common line from said pump.

6. The system according to claim 1, wherein
said at least one control port communicates with said outlet port, the latter constituting said another of said ports.

7. The system according to claim 3, wherein
said at least one control port communicates with said outlet port, the latter constituting said another of said ports.

8. The system according to claim 6, wherein
said second hydraulic circuit includes a connecting line connecting said outlet port to said inlet of said reducing valve,
an orifice in said line downstream of communication of said control port with said outlet port.

9. The system according to claim 8, wherein
said flow rate control valve defines a spring chamber in which said spring is disposed, and a port of said flow rate control valve communicates with said spring chamber and said connecting line downstream of said orifice.

10. The system according to claim 8, wherein
said at least one control port comprises two control ports, one of the latter communicating with an end chamber of said flow rate control valve, and said spring being located in an opposite end chamber of said flow rate control valve.

11. The system according to claim 6, wherein
said flow rate control valve is formed without a drain port.

12. The system according to claim 6, wherein
said at least one control port comprises two control ports, one of the latter communicating with an end chamber of said flow rate control valve, and said spring being located in an opposite end chamber of said flow rate control valve.

13. The system according to claim 1, wherein
said at least one control port communicates with said inlet port, the latter constituting said another of said ports.

14. The system according to claim 3, wherein
said at least one control port communicates with said inlet port, the latter constituting said another of said ports.

15. The system according to claim 13, wherein
said control port is formed at one chamber of said flow rate control valve and said inlet port communicates with an opposite chamber of said flow rate control valve, and said pressure responsive spool has an orifice forming slant which variably communicates said opposite chamber with said outlet port via said orifice forming slant depending on the position of said pressure responsive spool.

16. The system according to claim 15, wherein said spring is disposed in said opposite chamber.

17. The system according to claim 16, wherein said chambers are formed at opposite ends of said pressure responsive spool.

18. The system according to claim 1, wherein said pressure responsive spool and said ports of the flow rate control valve being cooperatively arranged so as to reduce the flow rate of the oil passing from the inlet port to the outlet port when pressure at the outlet port exceeds a predetermined value.

19. The system according to claim 1, wherein said pressure responsive spool and said ports of the flow rate control valve being cooperatively arranged so that said pressure responsive spool is positioned in dependency on the difference between the pressures at said inlet and outlet ports.

* * * * *